United States Patent
Janke et al.

(10) Patent No.: US 8,398,809 B2
(45) Date of Patent: Mar. 19, 2013

(54) AMORPHOUS POLYURETHANE POLYMER AND ITS USE IN HOTMELT ADHESIVES

(75) Inventors: Doreen Janke, Bonningstedt (DE); Kai Paschkowski, Jork (DE)

(73) Assignee: Sika Technology AG, Baar (CH)

( * ) Notice: Subject to any disclaimer, the term of this patent is extended or adjusted under 35 U.S.C. 154(b) by 425 days.

(21) Appl. No.: 12/458,083

(22) Filed: Jun. 30, 2009

(65) Prior Publication Data

US 2010/0006221 A1    Jan. 14, 2010

(30) Foreign Application Priority Data

Jul. 14, 2008   (EP) ..................................... 08160314

(51) Int. Cl.
*B65C 9/25* (2006.01)
*C04B 37/00* (2006.01)
*C08G 18/28* (2006.01)
*C08G 18/10* (2006.01)
*C08L 75/00* (2006.01)

(52) U.S. Cl. ........... 156/325; 156/322; 524/590; 528/59

(58) Field of Classification Search .................. 156/322, 156/325; 524/590; 528/59
See application file for complete search history.

(56) References Cited

U.S. PATENT DOCUMENTS

| | | | |
|---|---|---|---|
| 6,221,978 B1 * | 4/2001 | Li et al. ......................... | 525/452 |
| 2008/0251204 A1 * | 10/2008 | Burckhardt et al. ....... | 156/331.4 |
| 2010/0291368 A1 * | 11/2010 | Burckhardt et al. .......... | 428/221 |

FOREIGN PATENT DOCUMENTS

| | | | |
|---|---|---|---|
| CA | 2 628 327 A1 | | 4/2007 |
| EP | 1 923 445 A1 | | 5/2008 |
| WO | WO 2007/036575 A1 | | 4/2007 |
| WO | WO 2008/052999 A1 | | 5/2008 |
| WO | WO 2008/059056 | * | 5/2008 |

* cited by examiner

*Primary Examiner* — Michael Orlando
(74) *Attorney, Agent, or Firm* — Oliff & Berridge, PLC

(57) ABSTRACT

The present invention relates to innovative amorphous polyurethane polymers of the formula (I) and also to hotmelt adhesive compositions based on them. The compositions are notable for greatly improved dimensional stability after application, and are ideally suited to the adhesive bonding of transparent substrates. The polymers are notable for rapid, bubble-free curing.

15 Claims, No Drawings

AMORPHOUS POLYURETHANE POLYMER AND ITS USE IN HOTMELT ADHESIVES

FIELD OF THE INVENTION

The present invention relates to the field of polyurethane polymers and the field of hotmelt adhesives.

BACKGROUND ART

Amorphous thermoplastics have been used for some considerable time in hotmelt adhesives. Hotmelt adhesives of this kind, however, exhibit very poor retention of their three-dimensional shape; in other words, the shape dictated on application has within a very short time, as a result of flow of the adhesive, undergone such significant change that the geometry of the adhesive is for many applications no longer acceptable.

Polyurethane polymers terminated with aldimine groups are proposed by WO 2008/052999 A1, in combination with a liquid polyurethane polymer, for use in hotmelt adhesives for the purpose of influencing the open time and early strength.

SUMMARY OF THE INVENTION

It is an object of the present invention, therefore, to provide a thermoplastic polymer which is reactively crosslinkable, which exhibits substantially reduced flow of the applied adhesive and which is especially suitable for the bonding of transparent substrates.

Surprisingly it has been found that this object can be achieved by an amorphous polyurethane polymer us described herein and by a hotmelt adhesive composition as described herein.

It has further emerged that, as a result of the addition of these polyurethane polymers, the mechanical properties of an adhesive can be influenced not negatively but instead indeed positively. More particularly it has been found that the creep under load is greatly reduced.

By virtue of the transparency of the polyurethane polymer after curing, transparent bonds can be obtained very well. The polyurethane polymers of the formula (I) are simple to prepare and feature rapid, bubble-free curing. The polyurethane polymers of the formula (I) can be incorporated chemically into the matrix with ease, resulting in good leaching behaviour and long-term resistance. The aldehydes that form on reaction with water are of low volatility, more particularly odourless, and are therefore ideally suited especially to interior applications One particular key quality of the amorphous polyurethane polymer of the invention is the greatly improved dimensional stability, i.e., the significantly reduced flow, of the adhesive after application.

Further aspects of the invention are subject matter of further independent claims. Particularly preferred embodiments of the invention are subject matter of the dependent claims.

DESCRIPTION OF THE PREFERRED EMBODIMENTS

In a first aspect the present invention provides an amorphous polyurethane polymer which is solid at room temperature, of the formula (I).

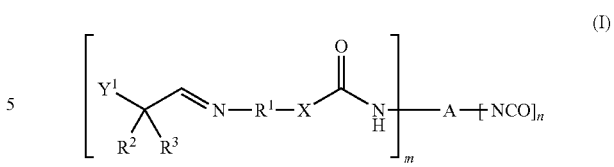

In this formula $R^1$ is a divalent aliphatic or cycloaliphatic or araliphatic hydrocarbon radical having 2 to 12 C atoms which optionally contains at least one heteroatom, more particularly in the form of ether oxygen or tertiary amine nitrogen.

Furthermore, $R^2$ and $R^3$ either independently of one another are each a monovalent hydrocarbon radical having 1 to 12 C atoms, or $R^2$ and $R^3$ together form a divalent hydrocarbon radical having 4 to 20 C atoms which is part of an unsubstituted or substituted carbocyclic ring having 5 to 8, preferably 6, C atoms.

$Y^1$ is a monovalent hydrocarbon radical having 1 to 35 C atoms which optionally contains heteroatoms.

X is O or S or N—$R^6$, where $R^6$ is either a monovalent hydrocarbon radical having 1 to 20 C atoms which optionally contains at least one carboxylic ester, nitrile, nitro, phosphonic ester, sulphone or sulphonic ester group, or $R^6$ is a substituent of the formula (II).

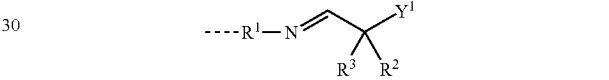

Moreover, m is 1 or 2 or 3 and n is 0 or 1 or 2. This is subject to the proviso that the sum of m and n is 2 or 3.

Furthermore, A is the radical of a polyurethane polymer D, containing isocyanate groups and solid at room temperature, following removal of (m+n) isocyanate groups. The polyurethane polymer D which contains isocyanate groups and is solid at room temperature is prepared from the reaction of a polyol mixture and also of at least one polyester isocyanate PI. This polyol mixture comprises at least one polyester polyol PE1 which is liquid at room temperature and at least one polyester polyol PE2 which is amorphous and solid at room temperature.

This is subject to the proviso that in the polyol mixture the weight ratio of all polyester polyols PE1 liquid at room temperature to all amorphous polyester polyols PE2 solid at room temperature is <1.25.

In this document the use of the term "independently of one another" in connection with substituents, radicals or groups is to be interpreted to mean that in the same molecule it is possible for the identically designated substituents, radicals or groups to occur simultaneously with different definitions.

The term "polymer" encompasses in the present document on the one hand a collective of chemically uniform macromolecules which differ, however, in respect of degree of polymerization, molar mass and chain lengths and which has been prepared by means of a polymerization reaction (addition polymerization, polyaddition or polycondensation). On the other hand the term also encompasses derivatives of such a collective of macromolecules from polymerization reactions, in other words compounds which have been obtained by reactions, such as additions or substitutions, for example, of functional groups on existing macromolecules and which may be chemically uniform or chemically non-uniform. The term further embraces what are called prepolymers as well, in other words reactive oligomeric preadducts whose functional groups have participated in the construction of macromolecules.

The term "polyurethane polymer" encompasses all polymers which are prepared by the process known as the diisocyanate polyaddition process. This also includes those polymers which are virtually or entirely free from urethane groups. Examples of polyurethane polymers are polyether-polyurethanes, polyester-polyurethanes, polyether-polyureas, polyester-polyureas, polyisocyanurates and polycarbodiimides.

"Room temperature" refers to a temperature of 25° C.

All softening points in this document are determined by the ring & ball method in accordance with DIN ISO 4625.

Substance names beginning with "poly", such as polyisocyanate or polyol, in the present document identify substances which formally contain two or more per molecule of the functional groups that occur in their name.

The term "primary amino group" in the present document identifies an $NH_2$ group which is attached to an organic radical, whereas the term "secondary amino group" identifies an NH group which is attached to two organic radicals which may also together be part of a ring.

An "aliphatic amino group" is an amino group which is attached to an aliphatic, cycloaliphatic or araliphatic radical. It thus differs from an "aromatic amino group", which is attached directly to an aromatic or heteroaromatic radical, such as in aniline or 2-aminopyridine, for example.

An "aliphatic HX group" is a group —HX which is attached to an aliphatic, cycloaliphatic or araliphatic radical. It thus differs from an "aromatic HX group", which is attached directly to an aromatic or heteroaromatic radical, as is present, for example, in phenol or N-methylaniline.

In the case of oligomers or polymers, in the present document, the "molecular weight" is always the molecular weight average $M_n$.

The dashed lines in the formulae in this document represent in each case the bond between a substituent and the associated molecular radical.

The polyurethane polymer D preferably has two isocyanate groups, i.e., the sum of m and n is preferably 2.

With further preference the polyurethane polymer of the formula (I) contains at least one isocyanate group, i.e., the value of n is 1 or 2, preferably 1.

A particularly preferred embodiment is that in which m is 1 and n is 1.

The polyurethane polymer of the formula (I) is an amorphous solid at room temperature. It possesses a softening point of more than 25° C., more particularly of more than 40° C., preferably of more than 60° C.

With particular preference $R^2$ and $R^3$ are each a methyl group.

The amorphous polyurethane polymer solid at room temperature, of the formula (I), may be prepared by reacting an aldimine of the formula (XI), more particularly of the formula (XI'), with a polyurethane polymer D containing isocyanate groups, of the formula (XII).

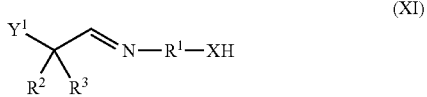

(XI)

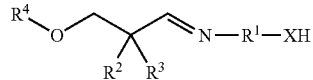

(XI')

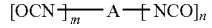

(XII)

This reaction is carried out advantageously at a temperature at which the polyurethane polymer D of the formula (XII) is in the liquid state, where appropriate with accompanying use of suitable catalysts, with the aldimine of the formula (XI), more particularly of the formula (XI'), being added stoichiometrically, slightly superstoichiometrically or substoichiometrically in relation to the isocyanate groups of the polyurethane polymer D.

In one embodiment the aldimine of the formula (XI) is substoichiometric in relation to the isocyanate groups of the polyurethane polymer D; in other words, it is added at less than one mole equivalent of moieties "HX" to one mole equivalent of isocyanate groups. In this way a polyurethane polymer of the formula (I) containing isocyanate groups and aldimine groups is formed in which, therefore, the index n is other than 0.

In a further embodiment the aldimine of the formula (XI) is stoichiometric or slightly superstoichiometric in relation to the isocyanate groups of the polyurethane polymer D; in other words, it is added at exactly one or somewhat more than one mole equivalent of moieties "HX" to one mole equivalent of isocyanate groups. In this way, polyurethane polymers of the formula (I) are formed which are solid at room temperature and contain aldimine groups which do not contain isocyanate groups, and in which, therefore, the index n is zero, and which are referred to below as polyurethane polymers A1.

Preferred polyurethane polymers of the formula (I) are polyurethane polymers A1, since on account of the absence of isocyanate groups they are particularly storage-stable even at an elevated temperature. More particularly the polyurethane polymer A1 in the liquid state, in other words at a temperature above its melting point, can be stored for a relatively long time, typically for a number of weeks or months, without a significant rise in its viscosity. This contrasts with the behaviour of melting components containing isocyanate groups, of the kind known from the prior art. As a result of the high reactivity of the isocyanate groups, the viscosity of such melting components in that case rises in the course of storage, particularly at an elevated temperature, typically in a rapid way, and this may lead to gelling. The high storage stability of the polyurethane polymer of the formula (I), in contrast, is of considerable practical importance, since as a result, its NCO-containing compositions exhibit little or no change in the course of storage, even at an elevated temperature, in terms of their application properties and curing properties, and in particular have open times and early strengths that are largely constant and show little dependency on production date and storage conditions.

Likewise preferred are polyurethane polymers of the formula (I) in which X is O or is $N-R^6$. Most preferably X is O.

Especially preferred are polyurethane polymers of the formula (I) in which X is O or $N-R^6$, where $R^6$ is a hydrocarbon radical having 1 to 4 C atoms, more particularly methyl, ethyl, propyl or butyl, preferably methyl. Compositions comprising these melting components exhibit rapid development of early strength.

Preferred polyurethane polymers are those of the formula (I) in which $Y^1$ is a radical of the formula (III).

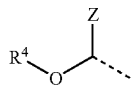
(III)

In this formula, Z is a hydrogen atom or is an alkyl or arylalkyl group having 1 to 8 C atoms, preferably a hydrogen atom.

Furthermore, $R^4$ either is a monovalent hydrocarbon radical having 1 to 30 C atoms which optionally contains at least one heteroatom, more particularly in the form of ether oxygen, or $R^4$ is a radical

where $R^5$ in turn is a monovalent hydrocarbon radical having 1 to 30 C atoms which optionally contains at least one heteroatom, more particularly in the form of ether oxygen.

In one preferred embodiment $Y^1$ is the radical of the formula (III) and $R^4$ is the radical

where $R^5$ is a monovalent hydrocarbon radical having 1 to 30 C atoms, more particularly an alkyl group having 11 to 30 C atoms.

More particularly it is preferred for either $R^4$ or $R^5$ to be a monovalent hydrocarbon radical, more particularly a linear or branched alkyl radical, having 11 to 30 C atoms. These preferred polyurethane polymers of the formula (I) and also the aldehydes formed in the course of hydrolysis are odourless.

The polyurethane polymer D of the formula (XII) is prepared from a polyol mixture and also from at least one polyisocyanate PI. This polyol mixture comprises at least one polyester polyol PE1 which is liquid at room temperature, and at least one amorphous polyester polyol PE2 which is solid at room temperature.

Particularly suitable polyester polyols for preparing a polyurethane polymer D are polyester polyols, also called oligoesterols, prepared, for example, from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols, with organic dicarboxylic acids or their anhydrides or esters, such as, for example, succinic acid, glutaric acid, adipic acid, pimelic acid, suberic acid, azelaic acid, sebacic acid, dodecanedicarboxylic acid, maleic acid, fumaric acid, phthalic acid, isophthalic acid, terephthalic acid and hexahydrophthalic acid, or mixtures of the aforementioned acids, and also polyester polyols from lactones such as ε-caprolactone, for example.

The polyester polyols PE1 and polyester polyols PE2 advantageously each have a molecular weight between 2000 and 10 000 g/mol.

Polyester polyols PE1 are liquid at room temperature. Particularly suitable polyester polyols liquid at room temperature are polyester diols. Particularly suitable polyester diols are those which are still liquid below 0° C., especially between −50° C. and 0° C. The polyester polyol PE1 which is liquid at room temperature preferably has a molecular weight of between 2000 and 8000 g/mol, more preferably between 4000 and 7000 g/mol.

Polyester polyols PE2 are solid and amorphous at room temperature. Particularly preferred polyester polyols PE2 are polyester diols which are selected from the group consisting of adipic acid/hexanediol polyester, azelaic acid/hexanediol polyester and dodecanedicarboxylic acid/hexanediol polyester, and which have a melting point, or softening point, in the range from 60° C. to 130° C., more particularly 80° C. to 110° C. The amorphous polyester polyol PE2 which is solid at room temperature preferably has a molecular weight of between 1000 and 8000 g/mol, more preferably between 2000 and 5000 g/mol, most preferably between 2000 and 3000 g/mol.

The weight ratio of all polyester polyols PE1 which are liquid at room temperature to all amorphous polyester polyols PE2 which are solid at room temperature is <1.25. This ratio is situated more particularly between 1.10 and 0.05, preferably at a value of 0.50-0.10. If this ratio is greater, there is a greater tendency to flow. If only polyester polyol PE2 which is solid at room temperature is used, i.e. if this ratio is 0, a corresponding composition has such a high viscosity, even at high temperatures, that it is typically very difficult to apply at the application temperature.

Polyisocyanates PI which can be used for preparing a polyurethane polymer D containing isocyanate groups include commercial aliphatic, cycloaliphatic or aromatic polyisocyanates, especially diisocyanates, examples being the following:

1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,10-decamethylene diisocyanate, 1,12-dodecamethylene diisocyanate, lysine diisocyanate and lysine ester diisocyanate, cyclohexane 1,3- and 1,4-diisocyanate and any desired mixtures of these isomers, 1-methyl-2,4- and -2,6-diisocyanatocyclohexane and any desired mixtures of these isomers (HTDI or $H_6$TDI), 1-isocyanato-3,3,5-trimethyl-5-isocyanatomethylcyclohexane (isophorone diisocyanate or IPDI), perhydro-2,4'- and -4,4'-diphenylmethane diisocyanate (HMDI or $H_{12}$MDI), 1,4-diisocyanato-2,2,6-trimethylcyclohexane (TMCDI), 1,3- and 1,4-bis(isocyanatomethyl)cyclo-hexane, m- and p-xylylene diisocyanate (m- and p-XDI), m- and p-tetramethyl-1,3- and -1,4-xylylene diisocyanate (m- and p-TMXDI), bis(1-isocyanato-1-methylethyl)naphthalene, 2,4- and 2,6-tolylene diisocyanate and any desired mixtures of these isomers (TDI), 4,4'-, 2,4'- and 2,2'-diphenylmethane diisocyanate and any desired mixtures of these isomers (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TODI), dianisidine diisocyanate (DADI), oligomers and polymers of the aforementioned isocyanates, and any desired mixtures of the aforementioned diisocyanates. Preference is given to MDI, TDI, HDI and IPDI.

With particular preference the polyisocyanate PI is a diisocyanate which is selected from the group consisting of 1,6-hexamethylene diisocyanate (HDI), 1-isocyanato-3,3,5-trimethyl-5-isocyanatomethylcyclohexane (isophorone diisocyanate or IPDI), 2,4- and 2,6-tolylene diisocyanate and any desired mixtures of these isomers (TDI) and 4,4'-, 2,4'- and 2,2'-diphenylmethane diisocyanate and any desired mixtures of these isomers (MDI).

This reaction to the polyurethane polymer D of the formula (XII) containing isocyanate groups takes place in a conventional way, more particularly by reaction of the polyol and the polyisocyanate at temperatures, for example, of 50° C. to 100° C., where appropriate with the accompanying use of suitable catalysts, the amount of polyisocyanate introduced being such that its isocyanate groups are in stoichiometric excess in relation to the hydroxyl groups of the polyol. Advantageously the ratio between isocyanate groups and hydroxyl groups is 1.2 to 5, more particularly from 1.5 to 3. After the reaction of all of the hydroxyl groups of the polyol, there is preferably a free isocyanate group content remaining of 0.5 to 5% by weight, based on the overall polyurethane polymer D.

Where appropriate the polyurethane polymer D can be prepared with the accompanying use of plasticizers, in which case the plasticizers used contain no isocyanate-reactive groups.

The aldimine of the formula (XI), more particularly of the formula (XI'), is obtainable by a condensation reaction, with elimination of water, between an amine of the formula (V) and an aldehyde of the formula (VI), more particularly an aldehyde of the formula (VI a). The amine of the formula (V) contains aliphatic primary amino groups and aliphatic HX groups. It is essential that the amine of the formula (V) contains no aromatic amino groups and no aromatic HX groups. The aldehyde is used stoichiometrically or in a stoichiometric excess in relation to the primary aliphatic amino groups of the amine of the formula (V).

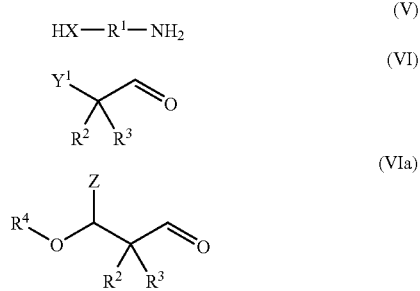

In the formulae (V), (VI) and (VI a), X, $R^1$, $R^2$, $R^3$, $R^4$, $Y^1$ and Z have the definitions already mentioned.

Suitable amines of the formula (V) in a first embodiment are compounds having one or two primary aliphatic and one secondary amino group, such as, for example, N-methyl-1,2-ethanediamine, N-ethyl-1,2-ethanediamine, N-butyl-1,2-ethanediamine, N-hexyl-1,2-ethanediamine, N-(2-ethylhexyl)-1,2-ethanediamine, N-cyclohexyl-1,2-ethanediamine, 4-aminomethylpiperidine, 3-(4-aminobutyl)piperidine, N-aminoethylpiperazine, diethylenetriamine (DETA), bishexamethylenetriamine (BHMT); diamines and triamines from the cyanoethylation or cyanobutylation of primary monoamines and diamines, examples being N-methyl-1,3-propanediamine, N-ethyl-1,3-propanediamine, N-butyl-1,3-propanediamine, N-hexyl-1,3-propanediamine, N-(2-ethylhexyl)-1,3-propanediamine, N-dodecyl-1,3-propanediamine, N-cyclohexyl-1,3-propanediamine, 3-methylamino-1-pentylamine, 3-ethylamino-1-pentylamine, 3-butylamino-1-pentylamine, 3-hexylamino-1-pentylamine, 3-(2-ethylhexyl)amino-1-pentylamine, 3-dodecylamino-1-pentylamine, 3-cyclohexylamino-1-pentylamine, dipropylenetriamine (DPTA), N3-(3-aminopentyl)-1,3-pentanediamine, N5-(3-aminopropyl)-2-methyl-1,5-pentanediamine, N5-(3-amino-1-ethylpropyl)-2-methyl-1,5-pentanediamine, and fatty diamines such as N-cocoalkyl-1,3-propanediamine, N-oleyl-1,3-propanediamine, N-soyaalkyl-1,3-propanediamine, N-tallowalkyl-1,3-propanediamine or N—($C_{16-22}$ alkyl)-1,3-propanediamine, as are obtainable, for example, under the trade name Duomeen® from Akzo Nobel; the products from the Michael-like addition of aliphatic primary diamines or triamines with acrylonitrile, maleic or fumaric diesters, citraconic diesters, acrylic and methacrylic esters, acrylamides and methacrylamides and itaconic diesters, reacted in a 1:1 molar ratio.

Suitable amines of the formula (V) in a second embodiment are aliphatic hydroxyamines, such as, for example, 2-aminoethanol, 2-methylaminoethanol, 1-amino-2-propanol, 3-amino-1-propanol, 4-amino-1-butanol, 4-amino-2-butanol, 2-amino-2-methylpropanol, 5-amino-1-pentanol, 6-amino-1-hexanol, 7-amino-1-heptanol, 8-amino-1-octanol, 10-amino-1-decanol, 12-amino-1-dodecanol, 4-(2-aminoethyl)-2-hydroxyethylbenzene, 3-aminomethyl-3,5,5-trimethylcyclohexanol; derivatives of glycols carrying one primary amino group, such as diethylene glycol, dipropylene glycol, dibutylene glycol and higher oligomers and polymers of these glycols, examples being 2-(2-aminoethoxy)ethanol, triethylene glycol monoamine, α-(2-hydroxymethylethyl)-ω-(2-aminomethylethoxy)poly(oxy(methyl-1,2-ethanediyl)); derivatives of polyalkoxylated trihydric or higher polyhydric alcohols that carry one hydroxyl group and one primary amino group; products from the single cyanoethylation and subsequent hydrogenation of glycols, examples being 3-(2-hydroxyethoxy)propylamine, 3-(2-(2-hydroxyethoxy)ethoxy)propylamine and 3-(6-hydroxyhexyloxy)propylamine.

Suitable amines of the formula (V) in a third embodiment are aliphatic mercaptoamines, such as, for example, 2-aminoethanethiol(cysteamine), 3-aminopropanethiol, 4-amino-1-butanethiol, 6-amino-1-hexanethiol, 8-amino-1-octanethiol, 10-amino-1-decanethiol, 12-amino-1-dodecanethiol and amino thio sugars such as 2-amino-2-deoxy-6-thioglucose.

Preferred amines of the formula (V) are amines which are selected from the group consisting of N-methyl-1,2-ethanediamine, N-ethyl-1,2-ethanediamine, N-cyclohexyl-1,2-ethanediamine, N-methyl-1,3-propanediamine, N-ethyl-1,3-propanediamine, N-butyl-1,3-propanediamine, N-cyclohexyl-1,3-propanediamine, 4-aminomethylpiperidine, 3-(4-aminobutyl)piperidine, DETA, DPTA, BHMT and fatty diamines such as N-cocoalkyl-1,3-propanediamine, N-oleyl-1,3-propanediamine, N-soyaalkyl-1,3-propanediamine and N-tallowalkyl-1,3-propanediamine; products from the Michael-like addition of aliphatic primary diamines with maleic and fumaric diesters, acrylic and methacrylic esters, acrylamides and methacrylamides, preferably with maleic diesters, more particularly dimethyl, diethyl, dipropyl and dibutyl maleate, and with acrylic esters, more particularly methyl acrylate, reacted in a 1:1 molar ratio; aliphatic hydroxyamines or mercaptoamines in which the primary amino group is separated from the hydroxyl or mercapto group by a chain of at least 5 atoms, or by a ring, more particularly 5-amino-1-pentanol, 6-amino-1-hexanol and higher homologues thereof, 4-(2-aminoethyl)-2-hydroxyethylbenzene, 3-aminomethyl-3,5,5-trimethylcyclohexanol, 2-(2-aminoethoxy)ethanol, triethylene glycol monoamine and higher oligomers and polymers thereof, 3-(2-hydroxyethoxy)propylamine, 3-(2-(2-hydroxyethoxy)ethoxy)propylamine and 3-(6-hydroxyhexyloxy)propylamine.

Particularly preferred amines of the formula (V) are those in which X is O or is N—$R^2$, where $R^2$ is an alkyl group having 1 to 4 C atoms, more particularly methyl, ethyl, propyl or butyl, preferably methyl. Polyurethane polymers of the formula (I) that are prepared therewith have the property that polyurethane compositions comprising such polyurethane polymers of the invention are notable for a rapid development of early strengths.

The amine of the formula (V), more particularly the radical $R^1$ on which the amine of the formula (V) is based, preferably has a molecular weight, or a formula weight, of 28 to 100 g/mol.

Aldehydes suitable for preparing an aldimine of the formula (XI) or (XI') are aldehydes of the formula (VI) or (VI a). A property of these aldehydes is that their radicals $Y^1$, $R^2$ and $R^3$ contain no moieties which in the absence of water are reactive with isocyanate groups; more particularly $Y^1$, $R^2$ and $R^3$ do not contain any hydroxyl groups, any primary or secondary amino groups, any urea groups or any other groups with active hydrogen.

Aldehydes of the formula (VI) are tertiary aliphatic or tertiary cycloaliphatic aldehydes, such as, for example, pivalaldehyde (2,2-dimethylpropanal), 2,2-dimethylbutanal, 2,2-diethylbutanal, 1-methylcyclopentanecarboxaldehyde, 1-methylcyclohexanecarboxaldehyde; and ethers of 2-hydroxy-2-methylpropanal and alcohols such as propanol, isopropanol, butanol and 2-ethylhexanol; esters of 2-formyl-2-methylpropionic acid or 3-formyl-3-methylbutyric acid and alcohols such as propanol, isopropanol, butanol and 2-ethylhexanol; esters of 2-hydroxy-2-methylpropanal and carboxylic acids such as butyric acid, isobutyric acid and 2-ethylhexanoic acid; and also the ethers and esters, described below as being particularly suitable, of 2,2-disubstituted 3-hydroxypropanals, -butanals or analogous higher aldehydes, more particularly of 2,2-dimethyl-3-hydroxypropanal.

Particularly suitable aldehydes of the formula (VI) are aldehydes of the formula (VI a). In a first embodiment $R^4$ is a hydrocarbon radical having 1 to 30 C atoms which where appropriate contains at least one heteroatom.

Aldehydes of this kind represent ethers of aliphatic, araliphatic or cycloaliphatic 2,2-disubstituted 3-hydroxyaldehydes with alcohols of the formula HO—$R^4$, more particularly fatty alcohols. Suitable 2,2-disubstituted 3-hydroxyaldehydes are obtainable in turn from aldol reactions, especially crossed aldol reactions, between primary or secondary aliphatic aldehydes, especially formaldehyde, and secondary aliphatic, secondary araliphatic or secondary cycloaliphatic aldehydes, such as, for example, 2-methylbutyraldehyde, 2-ethylbutyraldehyde, 2-methylvaleraldehyde, 2-ethylcaproaldehyde, cyclopentanecarboxaldehyde, cyclohexanecarboxaldehyde, 1,2,3,6-tetrahydrobenzaldehyde, 2-methyl-3-phenylpropionaldehyde, 2-phenylpropionaldehyde(hydratropaldehyde) or diphenylacetaldehyde.

Examples of such aldehydes include 2,2-dimethyl-3-(2-ethylhexyloxy)propanal, 2,2-dimethyl-3-lauroxypropanal and 2,2-dimethyl-3-stearoxypropanal In a second embodiment $R^4$ is a radical

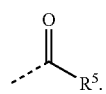

Suitable examples of aldehydes of this kind are esters of the above-described 2,2-disubstituted 3-hydroxyaldehydes, such as, for example, 2,2-dimethyl-3-hydroxypropanal, 2-hydroxymethyl-2-methylbutanal, 2-hydroxy-methyl-2-ethylbutanal, 2-hydroxymethyl-2-methylpentanal, 2-hydroxymethyl-2-ethylhexanal, 1-hydroxymethylcyclopentanecarboxaldehyde, 1-hydroxymethylcyclohexanecarboxaldehyde, 1-hydroxymethylcyclohex-3-enecarbox-aldehyde, 2-hydroxymethyl-2-methyl-3-phenylpropanal, 3-hydroxy-2-methyl-2-phenylpropanal and 3-hydroxy-2,2-diphenylpropanal, with suitable carboxylic acids.

Examples of carboxylic acids suitable for this purpose are, first, aliphatic carboxylic acids, such as formic acid, acetic acid, propionic acid, butyric acid, isobutyric acid, valeric acid, caproic acid, 2-ethylcaproic acid, capric acid, lauric acid, tridecanoic acid, myristic acid, pentadecanoic acid, palmitic acid, margaric acid, stearic acid, nonadecanoic acid, arachidic acid, palmitoleic acid, oleic acid, erucic acid, linoleic acid, linolenic acid, eleostearic acid, arachidonic acid, fatty acids from the industrial saponification of natural oils and fats such as, for example, rapeseed oil, sunflower oil, linseed oil, olive oil, coconut oil, oil palm kernel oil and oil palm oil, and also industrial mixtures of fatty acids which comprise such acids. Suitable carboxylic acids are, second, aromatic carboxylic acids, examples being benzoic acid or the positionally isomeric tolylic acids, ethyl- or isopropyl- or tert-butyl- or methoxy- or nitrobenzoic acids. Preferred carboxylic acids are fatty acids.

Preferred aldehydes of this kind are 2,2-dimethyl-3-lauroyloxypropanal, 2,2-dimethyl-3-myristoyloxypropanal, 2,2-dimethyl-3-palmitoyloxypropanal, 2,2-dimethyl-3-stearoyloxypropanal and 2,2-dimethyl-3-benzoyloxypropanal, and also analogous esters of other 2,2-disubstituted 3-hydroxyaldehydes.

In a particularly preferred embodiment $R^5$ is selected from the group consisting of phenyl and the $C_{11}$, $C_{13}$, $C_{15}$ and $C_{17}$ alkyl groups.

A particularly preferred aldehyde is 2,2-dimethyl-3-lauroyloxypropanal.

In one preferred preparation method of an aforementioned aldehyde a 2,2-disubstituted 3-hydroxyaldehyde, 2,2-dimethyl-3-hydroxypropanal for example, which can be prepared, for example, from formaldehyde (or paraformaldehyde) and isobutyraldehyde, in situ where appropriate, is reacted with a carboxylic acid to give the corresponding ester. This esterification can take place without the use of solvents by known methods, as described for example in Houben-Weyl, "Methoden der organischen Chemie", Vol. VIII, pages 516-528.

In one particularly preferred embodiment these aldehydes are odourless. By an odourless substance is meant a substance whose odour is so low that for the majority of human individuals it cannot be smelt, in other words cannot be perceived with the nose.

Odourless aldehydes are, first, especially aldehydes in which the radical $R^4$ is a hydrocarbon radical having 12 to 30 C atoms which optionally contains heteroatoms.

Odourless aldehydes, second, are aldehydes in which the radical $R^5$ is either a linear or branched alkyl chain having 11 to 30 C atoms, optionally with at least one heteroatom, more particularly with at least one ether oxygen, or is a singly or multiply unsaturated linear or branched hydrocarbon chain having 11 to 30 C atoms.

Examples of odourless aldehydes of the formula (VI) are esterification products of the aforementioned 2,2-disubstituted 3-hdroxyaldehydes with carboxylic acids such as, for example, lauric acid, tridecanoic acid, myristic acid, pentadecanoic acid, palmitic acid, margaric acid, stearic acid, nonadecanoic acid, arachidic acid, palmitoleic acid, oleic acid, erucic acid, linoleic acid, linolenic acid, eleostearic acid, arachidonic acid, fatty acids from the industrial saponification of natural oils and fats, such as, for example, rapeseed oil, sunflower oil, linseed oil, olive oil, coconut oil, oil palm kernel oil and oil palm oil, and also industrial mixtures of fatty acids which comprise these acids. Preferred aldehydes of the formula (VIII) are 2,2-dimethyl-3-lauroyloxypropanal, 2,2-dimethyl-3-myristoyloxypropanal, 2,2-dimethyl-3-palmitoyloxypropanal and 2,2-dimethyl-3-stearoyloxypropanal. 2,2-Dimethyl-3-lauroyloxypropanal is particularly preferred.

The aldimines of the formula (XI') of the odourless aldehydes, and also the polyurethane polymers of the formula (I) that are prepared from them, are likewise odourless.

A quality of the polyurethane polymers of the formula (I) with aliphatic aldimine groups is that their aldimine groups are unable to undergo tautomerization to form enamine groups, since they contain no hydrogen as substituents in α position to the C atom of the aldimine group. On the basis of this quality, together with polyurethane polymers containing isocyanate groups, they form mixtures which have a particularly good storability, in other words are largely stable in terms of viscosity, even in the presence of highly reactive aromatic isocyanate groups such as those of TDI and MDI.

In a further aspect the invention, as already mentioned above and already discussed in detail in the context of the polyurethane polymer of the formula (I), provides a process for preparing an amorphous polyurethane polymer of the formula (I) according to the invention which is solid at room temperature. This process is characterized in that this polyurethane polymer is prepared by the reaction of an aldimine of the formula (XI), more particularly of the formula (XI'), with a polyurethane polymer D containing isocyanate groups, of the formula (XII).

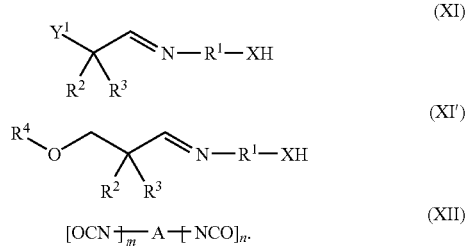

The polyurethane polymer of the formula (I), both before and after curing at room temperature, is solid and amorphous, and at room temperature forms a transparent solid.

In a further aspect, the invention provides a hotmelt adhesive composition comprising at least one above-described amorphous polyurethane polymer of the formula (I) that is solid at room temperature.

The amount of polyurethane polymer of the formula (I) is typically 40%-100%, more particularly 75%-100%, preferably 80%-100%, by weight, based on the overall hotmelt adhesive composition.

The hotmelt adhesive composition may further contain reactive polymers, especially polyurethane polymers containing isocyanate groups. This is especially advantageous when the polyurethane polymer of the formula (I) itself no longer contains any NCO groups, i.e. when n is 0. Preferably these are, on the one hand, the polyurethane polymers D containing isocyanate groups that are solid at room temperature, as already discussed above. On the other hand it is possible to use polyurethane polymers containing isocyanate groups that are liquid, crystalline or solid at room temperature. These polymers are prepared more particularly from polyoxyalkylene polyols, also called polyether polyols or oligoetherols, which are polymerization products of ethylene oxide, 1,2-propylene oxide, 1,2- or 2,3-butylene oxide, oxetane, tetrahydrofuran or mixtures thereof, and polyisocyanates in conventional manner.

The hotmelt adhesive composition may where appropriate comprise further substances in the form of auxiliaries and additives that are typically used in polyurethane chemistry.

Possible such auxiliaries and additives are, for example:
plasticizers, examples being carboxylic esters such as phthalates, e.g. dioctyl phthalate, diisononyl phthalate or diisodecyl phthalate, adipates, e.g. dioctyl adipate, azelates and sebacates, organic phosphoric and sulphonic esters or polybutenes;
non-reactive thermoplastic polymers, examples being homopolymers or copolymers of unsaturated monomers, more particularly from the group encompassing ethylene, propylene, butylene, isobutylene, isoprene, vinyl acetate or higher esters thereof, and (meth)acrylate, particular suitability being possessed by ethylene-vinyl acetate copolymers (EVA), atactic poly-α-olefins (APAO), polypropylenes (PP) and polyethylenes (PE);
solvents;
organic and inorganic fillers, examples being ground or precipitated calcium carbonates, with or without coating with stearates, or carbon blacks, especially industrially manufactured carbon blacks (referred to below as "carbon black"), barytes (BaSO4, also called heavy spar), kaolins, aluminium oxides, aluminium hydroxides, silicas, more particularly highly disperse silicas from pyrolysis processes, PVC powders or hollow beads;
fibres, of polyethylene for example;
pigments, examples being titanium dioxide or iron oxides;
catalysts which accelerate the hydrolysis of the blocked amino groups, such as, for example, organic carboxylic acids such as benzoic acid, salicylic acid or 2-nitrobenzoic acid, organic carboxylic anhydrides such as phthalic anhydride, hexahydrophthalic anhydride and hexahydromethylphthalic anhydride, silyl esters of organic carboxylic acids, organic sulphonic acids such as methanesulphonic acid, p-toluenesulphonic acid or 4-dodecylbenzenesulphonic acid, sulphonic esters, other organic or inorganic acids, or mixtures of the aforementioned acids and esters;
catalysts which accelerate the reaction of the isocyanate groups, examples being organotin compounds such as dibutyltin diacetate, dibutyltin dilaurate, dibutyltin dichloride, dibutyltin diacetylacetonate and dioctyltin dilaurate, bismuth compounds such as bismuth trioctoate and bismuth tris(neodecanoate), and compounds containing tertiary amino groups such as 2,2'-dimorpholinodiethyl ether and 1,4-diazabicyclo[2.2.2]octane;
rheology modifiers, examples being thickeners or thixotropic agents, for example urea compounds, polyamide waxes, bentonites or fumed silicas;
reactive diluents and crosslinkers, examples being oligomers of diisocyanates such as MDI, TDI and IPDI, more particularly in the form of isocyanurates, carbodiimides, uretonimines, biurets, allophanates or iminooxadiazinediones, adducts of diisocyanates such as MDI, TDI and IPDI with short-chain polyols, and also adipic dihydrazide and other dihydrazides;

latent curing agents with blocked amino groups, such as ketimines, oxazolidines, enamines or aldimines, for example;

dryers, such as molecular sieves, calcium oxide, highly reactive isocyanates such as p-tosyl isocyanate, orthoformic esters, alkoxysilanes such as tetraethoxysilane, organoalkoxysilanes such as vinyltrimethoxysilane, and organoalkoxysilanes which have a functional group in α position to the silane group, for example;

adhesion promoters, especially organoalkoxysilanes ("silanes") such as, for example, epoxysilanes, vinylsilanes, (meth)acrylosilanes, isocyanatosilanes, carbamatosilanes, alkylsilanes, S-(alkylcarbonyl)mercaptosilanes and aldiminosilanes, and also oligomeric forms of these silanes;

stabilizers against heat, light and UV radiation;

flame retardants;

surface-active substances such as wetting agents, flow control agents, deaerating agents or defoamers, for example;

biocides such as, for example, algicides, fungicides or fungal growth inhibitor substances.

It is advantageous to ensure that such additives do not adversely affect the storage stability of the hotmelt adhesive composition. In other words, during storage, these additives must not significantly initiate the reactions that lead to crosslinking, such as hydrolysis of the blocked amino groups or crosslinking of the isocyanate groups. In particular this means that all of these additives should contain no water, or traces of water at most. It can be sensible to carry out chemical or physical drying of certain additives prior to their incorporation.

It is of course clear to a person skilled in the art that certain of these optional constituents listed cannot be used if the aim is to formulate a transparent hotmelt adhesive.

The polyurethane polymer of the formula (I), and a hotmelt adhesive composition formulated from it, are distinguished in particular by the fact that they possess a better dimensional stability even over relatively long periods of time, or exhibit a low level of cold flow.

On the basis of its amorphous character, the polyurethane polymer of the formula (I), or a hotmelt adhesive composition formulated from it, is ideally suited to the adhesive bonding of transparent substrates, more particularly glass.

Polymers containing isocyanate groups react or polymerize on contact with water. The water needed for this purpose may come from the air (atmospheric humidity), or else the composition may be contacted with a water-containing component, by being sprayed, for example, or else a water-containing component may be added to the composition at application.

Polyurethane polymers of the formula (I) which contain not only isocyanate groups but also aldimino groups, i.e., for which n>0, may crosslink chemically with themselves on water contact. In the case of polyurethane polymers of the formula (I) with solely aldimino groups, i.e., for which n=0, further polymers containing isocyanate groups are needed for a chemical crosslinking. If such polymers are absent, the polyurethane polymer of the formula (I), or the composition formulated from it, likewise represents a thermoplastic component and may in principle be used as a hotmelt adhesive, but the polyurethane polymer of the formula (I), or the hydrolysis product resulting from it, is not incorporated chemically and is reversibly meltable, i.e. the polymer or the composition is not a reactive hotmelt adhesive.

The application temperature of the hotmelt adhesive composition is heavily dependent on the softening temperatures of the thermoplastic components present, more particularly on the softening temperature of the amorphous polyurethane polymer of the formula (I) that is solid at room temperature. A hotmelt adhesive is typically applied at a temperature at which the thermoplastic components are in melted form. More particularly the application temperatures are between 85° C. and 200° C., in particular between 100° C. and 150° C.

Where the above-described hotmelt adhesive composition is applied hot, in other words at a temperature above the softening point of the polyurethane polymer of the formula (I), curing takes place by two operations. On the one hand the composition solidifies on cooling, with the polyurethane polymer of the formula (I) and other thermoplastic components present in the hotmelt adhesive undergoing solidification, as result of which the viscosity of the composition is greatly increased. This physical curing ends the open time after a certain point in time and produces the early strength of the composition. In parallel with this, the composition cures chemically by means of moisture, in conjunction with the development of ultimate strength.

Particular features of the hotmelt adhesive composition are that it cures rapidly and without bubbles.

Accordingly the present invention further provides a cured hotmelt adhesive composition which is obtained by the reaction of moisture with an as-described hotmelt adhesive composition.

As a result of the use of the polyurethane polymer of the formula (I), the cured hotmelt adhesive composition exhibits low creep, i.e. self-deformation under static load, as compared with the corresponding adhesives which contain no polyurethane polymer of the formula (I).

The hotmelt adhesive composition is used more particularly as a hotmelt adhesive or casting compound.

This use takes place primarily in vehicle manufacture or in construction or civil engineering or in the glass or packaging or electronics industries.

The term vehicle manufacture also includes operations which are used for producing parts for installation. A particularly important field of use is that of lamination. The hotmelt adhesive composition is used more particularly for producing interior trim parts of vehicles, more particularly of cars. Examples of interior trim parts of this kind are door side parts, switch panels, parcel shelves, roof panel linings, sliding-roof panel linings, centre consoles, glove boxes, sun visors, pillars, door handles, arm rests, floor assemblies, loading-floor assemblies and boot assemblies, and also sleeping-cab walls and rear walls of vans and trucks. Vacuum forming processes and press lamination processes are typically employed for these purposes.

On the basis of the properties, particularly the transparency, preferred hotmelt adhesive compositions can be used very effectively as a sag-resistant casting compound in the electrical and/or electronic industry, as for example in the potting or sealing of chips or other electronic components. Alternatively the hotmelt adhesive composition can be used, for example, for the casting of cams for the production of conveyor belts.

Within the packaging industry the hotmelt adhesive composition finds use, preferably, for visible adhesive bonds, especially where the aesthetics are important. Examples of this are its use in the bonding of transparent films or in the production of transparent cartons.

In a further aspect, finally, the present invention provides a method of adhesively bonding substrates S1 and S2, comprising the steps of i) heating a hotmelt adhesive composition as described above to a temperature between 85° C. and 200° C., more particularly between 120° C. and 160° C.;

ii) applying the heated composition to a substrate S1;

iii) contacting the applied composition with a second substrate S2 within the open time;

the second substrate S2 being composed of the same material as or a different material to the substrate S1.

In step i) of the heating of the hotmelt adhesive composition to a temperature between 85° C. and 200° C., more particularly between 120° C. and 160° C., the hotmelt adhesive is melted.

Suitable substrates S1 or S2 are, for example, inorganic substrates such as glass, glass ceramic, concrete, mortar, brick, tile, gypsum and natural stone such as granite or marble; metals or alloys such as aluminium, steel, non-ferrous metals, galvanized metals; organic substrates such as leather, fabrics, paper, wood, resin-bound wood-based materials, resin-textile composite materials, plastics such as polyvinyl chloride (PVC), acrylonitrile-butadiene-styrene copolymers (ABS), SMC (sheet moulding composites), polycarbonate (PC), polyamide (PA), polyesters, polyoxymethylene (POM), epoxy resins, polyurethanes (PUR), polyolefins (PO), especially polyethylene (PE) and polypropylene (PP) surface-treated by plasma, corona or flame, ethylene/propylene copolymers (EPM) and ethylene/propylene-diene terpolymers (EPDM); and also paints and finishes, especially automotive finishes.

The substrates S1 and/or S2 may where necessary be pretreated before the above-described composition is applied. Such pretreatments include, more particularly, physical and/or chemical cleaning methods, examples being abrading, sandblasting, brushing or the like, or treatment with cleaners or solvents; or the application of an adhesion promoter, coupling agent solution or primer; or flame treatment or plasma treatment, more particularly an air plasma pretreatment at atmospheric ambient pressure.

These described bonding methods produce an article.

This article is more particularly a built structure, more particularly a built structure of construction or civil engineering, or an industrial product or consumer product, more particularly a window, a household appliance or a means of transport, more particularly a water or land vehicle, preferably a car, bus, lorry, train or boat, or a component for installation on or in a means of transport, or an article of the furniture, textile or packaging industry.

Suitable applications are, for example, the adhesive bonding of components in construction or civil engineering and in the manufacture or repair of industrial products or consumer products, more particularly of windows, household appliances or means of transport such as water or land vehicles, preferably cars, buses, lorries, trains or boats; or the sealing of joints, seams or cavities in industrial manufacture or repair, or in construction or civil engineering.

EXAMPLES

Description of the Test Methods

The total amount of aldimino groups and free amino groups in the compounds prepared ("amine content") was determined titrimetrically (using 0.1N $HClO_4$ in glacial acetic acid, against crystal violet) and is always indicated in mmol $NH_2/g$ (even when the amino groups present are not only primary amino groups).

Flow Behaviour

For the flow behaviour the following Taler method was used:

Two Teflon® rings differing in height (4 and 6 mm) and having an internal diameter of approximately 35 mm were each placed on a piece of siliconized paper. The hotmelt adhesives specified in Table 1 were heated to a temperature of 150° C. and in the melted state were poured into these rings and smoothed off with a spatula. After the adhesive had cooled to room temperature, the moulding ring was removed, to leave two free-standing cylindrical mouldings of 4 mm and 6 mm in height ("h"). The diameter was measured and reported as $D_0$ in Table 1. Subsequently the diameter of the cylindrical moulding was measured after storage for 3 days and for 2 months, i.e. after full curing, at 23° C. and 55% relative humidity, and reported as $D_{3d}$ and $D_{2m}$, respectively, in Table 1. For the extent of the flow behaviour, the percentage increase $\Delta_D$ in diameter reported ($\Delta_D=[D_{2m}/D_0]-1$) was employed. The greater the flow, the higher the value of $\Delta_D$.

Bubbles and Appearance

The cured specimens were inspected and set out in Table 1. In relation to the assessment of the transparency, the specimens were placed on a sheet with writing on it in the Arial font in a text size of 12 point. If it was possible readily to read the text through the specimen, the transparency was assessed as being "high"; if reading was not possible, the transparency was assessed as "low".

Aldimine ALD

A round-bottomed flask was charged under nitrogen atmosphere with 28.06 g (0.099 mol) of 2,2-dimethyl-3-lauryloxypropanal. With vigorous stirring, 10.00 g (0.095 mol) of 2-(2-aminoethoxy)ethanol (Diglycolamine® agent; Huntsman) were added from a dropping funnel over the course of 3 minutes, the temperature of the reaction mixture climbing to 40° C. Thereafter the volatile constituents were removed under reduced pressure (10 mbar, 80° C.). This gave 36.3 g of a colourless, clear and odourless liquid which was highly mobile at room temperature and had an amine content of 2.58 mmol $NH_2/g$.

Table 1 shows the compositions of Examples 1 to 6 and also of the comparative examples which were non-inventive examples, Ref.1 to Ref.5 in parts by weight. The polyester polyol used that was liquid at room temperature was Dynacoll® 7250 (Degussa) ("PE1-1"); the polyester polyol used that was amorphous and solid at room temperature was Dynacoll® 7150 (Degussa) ("PE2-1"). The polyisocyanate used was Desmodur® 44 MC (flakes, Bayer) ("MDI") or Desmodur® T-100 (Bayer)("TDI"). The amount of MDI used was calculated so as to use two equivalents of NCO per equivalent of OH.

TABLE 1

Compositions of hotmelt adhesive compositions and their results.

|  | 1 | 2 | 3 | 4 | 5 | Ref. 1 | Ref. 2 | Ref. 3 | Ref. 4 | 6 | Ref. 5 |
| --- | --- | --- | --- | --- | --- | --- | --- | --- | --- | --- | --- |
| PE1-1 | 10 | 20 | 30 | 40 | 50 | 50 | 60 | 70 | 80 | 50 | 50 |
| PE2-1 | 90 | 80 | 70 | 60 | 50 | 50 | 40 | 30 | 20 | 50 | 50 |
| ALD | 9.2 | 9.2 | 9.2 | 9.2 | 9.2 |  | 9.2 | 9.2 | 9.2 | 10 |  |
| MDI | 19.1 | 18.1 | 17.1 | 16.1 | 15.1 | 15.1 | 14.1 | 13.1 | 12.1 |  |  |
| TDI |  |  |  |  |  |  |  |  |  | 10.2 | 10.2 |
| PE1-1/PE2-1 | 0.11 | 0.25 | 0.43 | 0.67 | 1.00 | 1.00 | 1.50 | 2.33 | 4.00 | 1.00 | 1.00 |

TABLE 1-continued

Compositions of hotmelt adhesive compositions and their results.

|  | 1 | 2 | 3 | 4 | 5 | Ref. 1 | Ref. 2 | Ref. 3 | Ref. 4 | 6 | Ref. 5 |
|---|---|---|---|---|---|---|---|---|---|---|---|
| h = 6 mm | | | | | | | | | | | |
| $D_0$ [mm] | 36.0 | 36.2 | 36.0 | 36.0 | 36.2 | 35.8 | 35.3 | 35.9 | 36.4 | 35.8 | 36.0 |
| $D_{3d}$ [mm] | 36.0 | 36.2 | 36.1 | 36.4 | 36.4 | 39.8 | 38.1 | 37.2 | 38.5 | 36.0 | 44.5 |
| $D_{2m}$ [mm] | 36.0 | 36.2 | 36.1 | 36.4 | 36.4 | 39.8 | 38.1 | 37.5 | 39.0 | 36.7 | 46.1 |
| $\Delta_D$ [%] | 0 | 0 | 0 | 1 | 1 | 11 | 8 | 4 | 7 | 3 | 28 |
| h = 4 mm | | | | | | | | | | | |
| $D_0$ [mm] | 33.3 | 33.6 | 33.3 | 32.7 | 32.5 | 33.2 | 32.3 | 32.0 | 34.0 | 32.5 | 32.0 |
| $D_{3d}$ [mm] | 33.3 | 33.6 | 33.3 | 32.9 | 32.8 | 34.8 | 32.9 | 32.7 | 34.2 | 32.6 | 36.5 |
| $D_{2m}$ [mm] | 33.3 | 33.6 | 33.3 | 32.9 | 32.8 | 34.8 | 32.9 | 32.7 | 35.0 | 32.8 | 37.0 |
| $\Delta_D$ [%] | 0 | 0 | 0 | 1 | 1 | 5 | 2 | 2 | 3 | 1 | 16 |
| Bubbles | none | none | none | none | none | lots | none | none | none | none | lots |
| Transparency | high | high | high | high | high | low | high | high | high | high | low |

The invention claimed is:

1. Amorphous polyurethane polymer which is solid at room temperature, of formula (I)

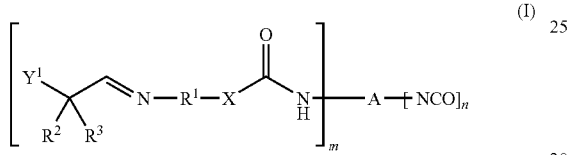

where
$R^1$ is a divalent aliphatic or cycloaliphatic or araliphatic hydrocarbon radical having 2 to 12 C atoms, which optionally contains at least one heteroatom;
$R^2$ and $R^3$ either
independently of one another, are each a monovalent hydrocarbon radical having 1 to 12 C atoms,
or
together form a divalent hydrocarbon radical having 4 to 20 C atoms which is part of an unsubstituted or substituted carbocyclic ring having 5 to 8 C atoms;
$Y^1$ is a monovalent hydrocarbon radical having 1 to 35 C atoms which optionally contains heteroatoms;
X is O or S or N—$R^6$,
where $R^6$ either
is a monovalent hydrocarbon radical having 1 to 20 C atoms which optionally contains at least one carboxylic ester, nitrile, nitro, phosphonic ester, sulphone or sulphonic ester group,
or
is a substituent of the formula (II)

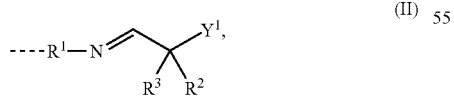

m is 1 or 2 or 3, n is 0 or 1 or 2, wherein the sum of m and n is 2 or 3;
A is the radical of a polyurethane polymer D, solid at room temperature and containing isocyanate groups, following removal of (m+n) isocyanate groups and prepared from the reaction of a polyol mixture comprising
at least one polyester polyol PE1 which is liquid at a temperature range of −50° C. to 0° C.,
at least one polyester polyol PE2 which is amorphous and solid at room temperature, and
at least one polyisocyanate PI, wherein
in the polyol mixture the weight ratio of all polyester polyols PE1 liquid at room temperature to all amorphous polyester polyols PE2 amorphous and solid at room temperature is 0.1-0.5,
the at least one polyester polyol PE1 has a molecular weight ranging from 2,000 to 8,000 g/mol, and
the at least one polyester polyol PE2 has a molecular weight ranging from 1,000 to 8,000 g/mol, and has a melting point ranging from 60° C. to 130° C.

2. Amorphous polyurethane polymer solid at room temperature according to claim 1, wherein m is 1 and n is 1.

3. Amorphous polyurethane polymer solid at room temperature according to claim 1, wherein $R^2$ and $R^3$ are each a methyl group.

4. Amorphous polyurethane polymer solid at room temperature according to claim 1, wherein $Y^1$ is a radical of the formula (III)

where Z is a hydrogen atom or is an alkyl or arylalkyl group having 1 to 8 C atoms,
$R^4$ either
is a monovalent hydrocarbon radical having 1 to 30 C atoms which optionally contains at least one heteroatom,
or
is a radical

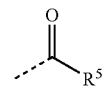

where $R^5$ is a monovalent hydrocarbon radical having 1 to 30 C atoms which optionally contains at least one heteroatom.

5. Amorphous polyurethane polymer solid at room temperature according to claim 4, wherein $R^4$ is the radical

where $R^5$ is a monovalent hydrocarbon radical having 1 to 30 C atoms.

6. Amorphous polyurethane polymer solid at room temperature according to claim 1, wherein $R^1$ has a formula weight of 28 to 100 g/mol.

7. Amorphous polyurethane polymer solid at room temperature according to claim 1, wherein the polyisocyanate PI is a diisocyanate.

8. Amorphous polyurethane polymer solid at room temperature according to claim 1, wherein the polyester polyol PE1 which is liquid at room temperature has a molecular weight ranging from 4,000 to 7,000 g/mol and the polyester polyol PE2 which is amorphous and solid at room temperature has a molecular weight ranging from 2,000 and 5,000 g/mol.

9. Amorphous polyurethane polymer solid at room temperature according to claim 1, wherein X is O or N—$R^6$.

10. Process for preparing an amorphous polyurethane polymer solid which is at room temperature, of the formula (I), according to claim 1, wherein this polyurethane polymer is prepared by reacting an aldimine of the formula (XI), with a polyurethane polymer D containing isocyanate groups, of the formula (XII)

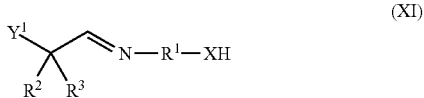

11. Hotmelt adhesive composition comprising at least one amorphous polyurethane polymer which is solid at room temperature, of the formula (I), according to claim 1.

12. Hotmelt adhesive composition according to claim 11, wherein the amount of polyurethane polymer of the formula (I) is 40%-100% by weight, based on the total hotmelt adhesive composition.

13. Cured hotmelt adhesive composition obtained by reaction of moisture with a hotmelt adhesive composition according to claim 11.

14. Method of adhesively bonding substrates S1 and S2, comprising:
  i) heating a hotmelt adhesive composition according to claim 11 to a temperature between 85° C. and 200° C.,
  ii) applying the heated composition to a substrate S1;
  iii) contacting the applied composition with a second substrate S2 within an open time;
  the second substrate S2 being composed of a same material as or a different material as the material of substrate S1.

15. Amorphous polyurethane polymer solid at room temperature according to claim 1, wherein the at least one polyester polyol PE2 has a molecular weight ranging from 2,000 to 3,000 g/mol and has a melting point ranging from 80° C. to 110° C.

* * * * *